Figure 1:
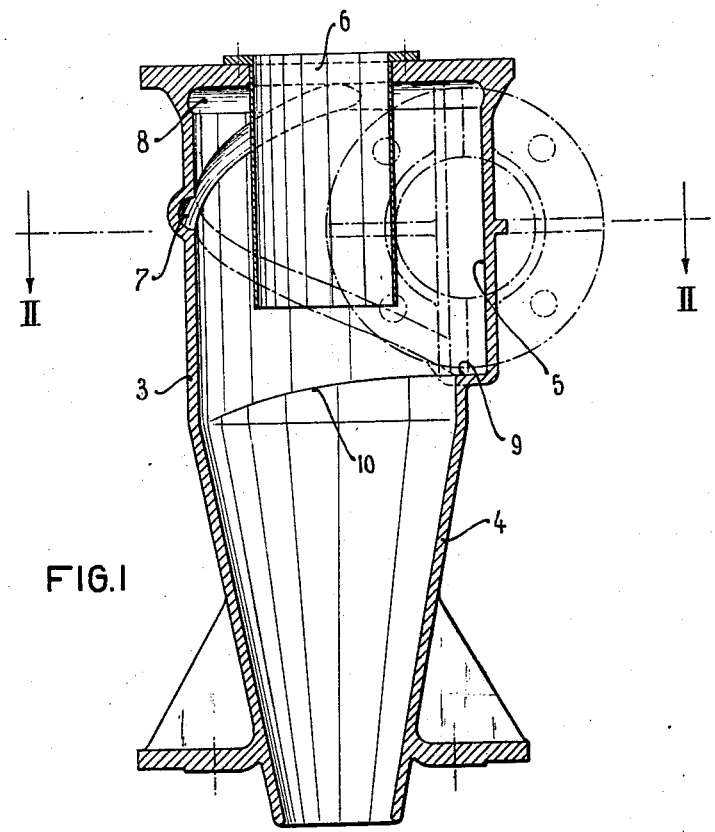

June 19, 1945. H. VAN TONGEREN 2,378,600

CENTRIFUGAL DUST SEPARATOR

Filed Sept. 6, 1941

INVENTOR
H. VAN TONGEREN

Patented June 19, 1945

2,378,600

UNITED STATES PATENT OFFICE 2,378,600

CENTRIFUGAL DUST SEPARATOR

Hermannus van Tongeren, Heemstede, Netherlands; vested in the Alien Property Custodian Application September 6, 1941, Serial No. 409,905
In the Netherlands September 9, 1940

1 Claim. (Cl. 183—83)

The invention relates to a centrifugal dust separator. This generally consists of a vertically disposed cylindrical chamber having, in addition to a conical lower part from which the separated solids are discharged, a cleaned gas outlet located opposite said dust discharge opening and a tangential intake for the dust laden gas. The dust laden gas enters tangentially and with a relatively high velocity into the chamber through the gas intake and is thus compelled to move in a substantially annular path, so that the larger part of the dust, due to the inertia of the particles, is thrown outwards towards the wall and falls through the conical lower part into a bunker attached thereto.

It is pertinent here to state that it is not necessary for a centrifugal dust separator to be provided with a cone at the lower end of the cylindrical chamber. The cone may be dispensed with, and the chamber provided, for instance in a bottom portion of increased diameter, with one or more tangential skimming openings.

From my prior U. S. patent specification 2,039,692, however, it is known that the path of the gas in the apparatus is not as simple as that. In the cylindrical chamber, a double eddy is produced, which causes a non-uniform distribution of the dust thrown outwards towards the wall of the chamber, and a concentration of dust around the cleaned gas outlet, where a whirling dust ring is formed. When this ring has attained a predetermined density, it falls down, whereupon another ring is gradually formed. Another part of the dust thrown towards the wall is conveyed directly to the bottom part through the influence of the lower half of the double eddy.

In order to prevent the formation of a dust ring referred to above, it has already been suggested to provide a by-pass on the outer wall of the apparatus, said by-pass connecting an opening in the upper part of the cylindrical chamber with an opening located below the central plane of the double eddy, either in the lower part of said chamber, or in the cone. This construction has also been disclosed by my aforesaid prior specification No. 2,039,692 and my later Patent No. 2,152,114. The essential features of the double eddy structure comprise a casing with a vertically disposed side wall having a tangential inlet for the dust-laden gases and a closed top through which passes an outlet pipe for the cleaned gas, this outlet pipe extending down into the casing with its open lower end disposed between the planes of the upper and the lower ends of said tangential inlet. This structure results in the production of two eddy currents, one in the upper part of the casing and the other in the lower part. Such a by-pass, however, cannot always be used, since with fibrous or tarry dust it is liable to be clogged. Besides, it increases the initial cost and the overall dimensions of the apparatus.

According to my present invention, the dust ring can be eliminated by means of a groove in the inner wall of the cylindrical chamber, said groove extending spirally downward from the top of this chamber to somewhat below the central plane of the double eddy. For large apparatuses, which as a rule are manufactured of sheet iron, the provision of such a groove is less advisable, but it is particularly suited for small cast iron cyclones, since it does not appreciably increase the initial cost of the required castings.

Figure 2:
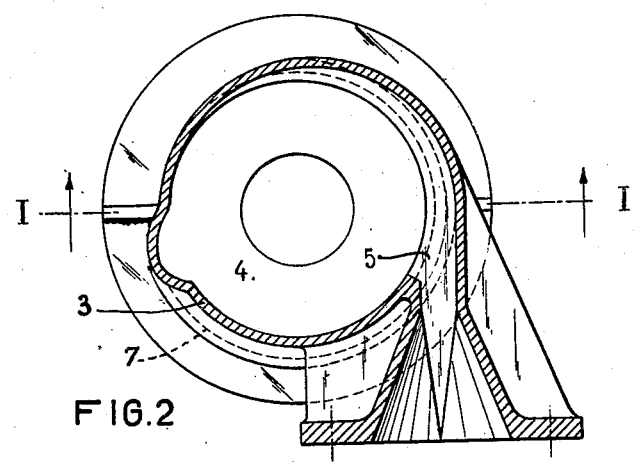

In the drawing, Fig. 1 shows a longitudinal section along the line I—I in Fig. 2 of a cyclone in accordance with the invention, and Fig. 2 is a cross-section along the line II—II in Fig. 1.

The apparatus shown consists of a cylindrical upper part 3 and of a conical lower part 4. 5 is the tangential gas intake. 6 is the cleaned gas outlet, which extends downwardly from the upper end of part 3 with its lower end at about the level of the central plane of the double eddy structure.

The helical groove, which, according to my invention, is substituted for the known by-pass and which is recessed in the inner wall of the cylindrical part 3, is designated by 7. Its upper end merges into a horizontal peripheral groove 8 provided just underneath the top wall of part 3, where the intake 5 merges into the cylindrical inner wall. The lower end of groove 7 is located below the central plane of the double eddy structure, and in the lower end of the intake 5.

The rotating dust ring, which tends to form in groove 8, is continuously carried downwards through groove 7. The dust particles moving down through groove 7 cannot, or only for a very small part, be whirled upwards again by the upwardly directed branch of the double eddy current, since they are sunk in said groove.

In the example shown, the intake 5 extends downwards to below the level of the central plane of the double eddy structure. This, however, is not strictly necessary, although it favourably affects the dust recovery percentage. The bottom wall 9 of the tangential intake slopes down along a helix 10, whereby the lower half of the double eddy current can more readily sweep the dust towards the cone 4.

What I claim is:

In a centrifugal dust separator, the combination of a separation chamber formed by a vertical cylindrical side wall and a horizontal top wall; a tangential inlet conduit communicating with said chamber, and having its bottom formed as a tapered, downwardly-sloping, arcuate ledge, for admitting dust-laden gas to the chamber; a cleaned gas outlet conduit communicating with said chamber through said top wall, and having its inlet end disposed in a horizontal plane below the horizontal axis of the chamber; and a discharge conduit extending downwardly from the bottom of the side wall of said chamber, for discharging separated dust from the chamber, the separation chamber being provided with a dust-conducting groove consisting of a horizontal portion describing a 360° arc at the junction of said top and side walls, and a helical portion formed by a recess in said side wall, describing an arc of over 180°, extending from the horizontal portion to the said ledge of the inlet conduit, said ledge forming a continuation of said groove, describing an arc of substantially 180°, said groove and said ledge co-operating to form a continuous dust-conducting channel from the upper end of said chamber to the junction of said chamber and said discharge conduit, for evacuating separated dust from the chamber.

HERMANNUS VAN TONGEREN.